United States Patent

Knauer et al.

Patent Number: 5,331,348
Date of Patent: Jul. 19, 1994

[54] ADAPTIVE LEAK HDTV ENCODER

[75] Inventors: Scott C. Knauer, Mountainside; Kim N. Matthews, Watchung; Arun N. Netravali, Westfield; Eric D. Petajan, Watchung; Robert J. Safranek, New Providence, all of N.J.

[73] Assignee: AT&T Laboratories, Murray Hill, N.J.

[21] Appl. No.: 919,792

[22] Filed: Jul. 27, 1992

[51] Int. Cl.⁵ .............................. H04N 7/137
[52] U.S. Cl. ..................... 348/402; 348/407; 348/417; 348/419; 348/423; 348/585; 348/598
[58] Field of Search ............ 358/133, 135, 136; H04N 7/137

[56] References Cited

U.S. PATENT DOCUMENTS 5,134,475 12/1990 Johnston et al. ............. 358/133
5,134,477 7/1992 Knauer ...................... 358/136
5,164,963 11/1992 Lawrence ..................... 375/39
5,243,419 9/1993 Faryar ....................... 358/133

Primary Examiner—Howard W. Britton
Attorney, Agent, or Firm—Henry T. Brendzel

[57] ABSTRACT

An improved predictive encoder where the leak signal is a function of the buffer fullness of the encoder. More specifically, the signals stored in the encoder output buffer are further encoded based on the fullness of the buffer, and information about this further encoding is used in determining the leak factor level. In accordance with another improvement, this leak factor level is not constrained to granularity that is imposed by the decoder hardware. Removal of the constraint is accomplished by cycling through a sequence of permissible leak levels that averages at the desired level.

9 Claims, 14 Drawing Sheets

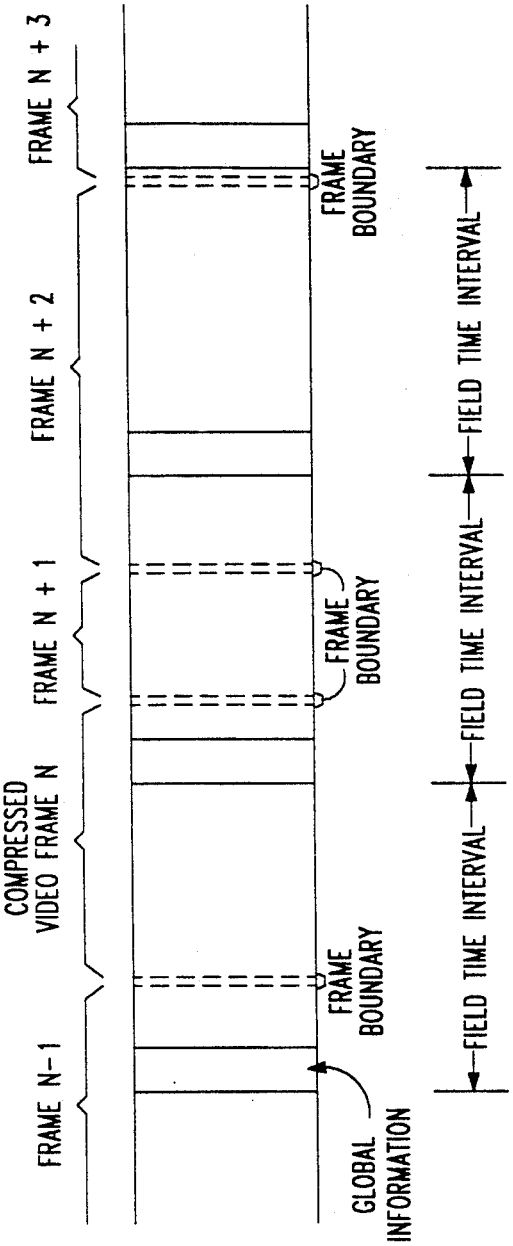
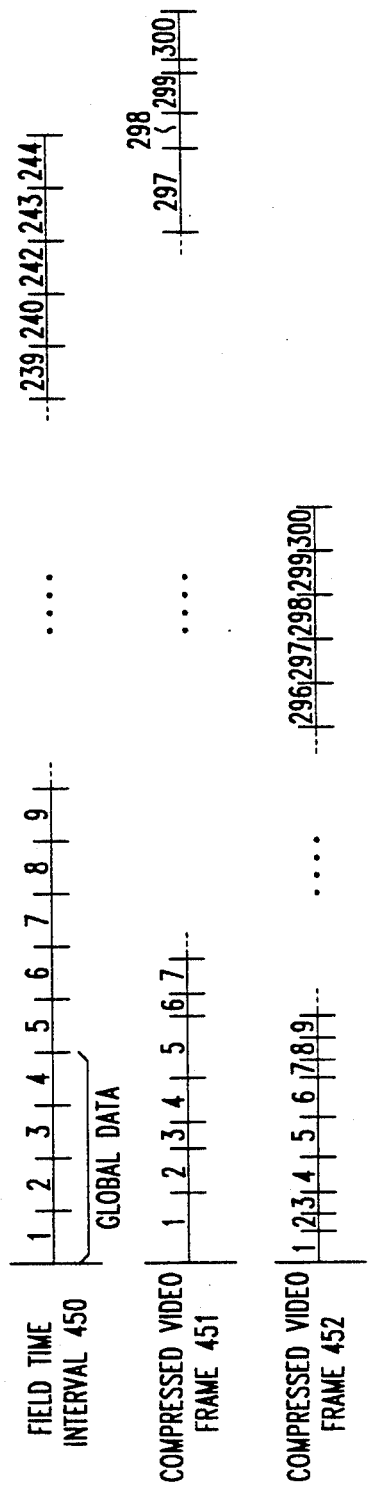
FIG. 19
FIG. 20

ADAPTIVE LEAK HDTV ENCODER

CROSS-REFERENCE TO RELATED APPLICATION

This invention is related to U.S. application Ser. No. 07/625,522, filed Dec. 11, 1990, now U.S. Pat. No. 5,134,475, issued Jul. 28, 1992.

BACKGROUND OF THE INVENTION

This invention relates to coding of digital signals. More particularly, this invention relates to enhancement of differential coding of signals that improves the noise immunity of the coded signals.

In principle, it is possible to transmit analog video signals (image signals) in digital form, which is typically obtained by sampling and linearly quantizing the analog signals. When image signals are digitized and linearly quantized, a transmission rate of about 100 Mbits per second is necessary for images derived from standard TV signals. For HDTV, a much higher transmission rate would be required.

In order to reduce this rate, various coding schemes have been studied. One is the so-called "differential pulse code modulation" (DPCM) coding approach. By this method, the value of a particular pixel at any moment is predicted on the basis of values of pixels which have been already coded. The necessary number of bits is reduced by coding the difference (error) between the predicted value and the value of the particular pixel at that moment. In the above-mentioned related application, the encoding process is similar in that video signals are also encoded differentially. The code developed for a pixel group is a function of the difference between the pixel group and a previous pixel group.

The disclosed encoding method has a problem in that it is unforgiving of errors. More specifically, since the encoding process needs information about past signals, both the encoder and the decoder include feedback loops which provide the needed past signal information. As long as no errors are introduced between the encoder and the decoder, the two loops track each other and the decoder output faithfully reproduces the encoder's input (within the encoder's quantizing error). Alas, when an error is introduced in the decoder, it has no way of knowing the presence of this error. What is more disturbing, however, is that the decoder's feedback loop perpetuates this error. That is, a noise spike can be easily tolerated when it occurs momentarily, but if it persists, then it is no longer a noise spike.

The problem of error perpetuation is solved in the '475 patent by causing a changing, rather than a fixed, fraction of the input signal to leak through to the encoder. The fraction leaked, is sensitive to the characteristics of the signal. In one embodiment, the fraction leaked is fixed for a frame in accordance with a chosen characteristic of the frame signal. In another embodiment, the fraction leaked is set in accordance with one function when a chosen characteristic of the frame signal exceeds a given level, and follows another function when the chosen characteristic does not exceed the chosen level. In a still another embodiment, the fraction leaked is set to one of two levels, based on a chosen characteristic of the frame signal.

SUMMARY OF THE INVENTION

The improvement of this invention develops a leak signal as a function of the buffer fullness of the encoder, creating a feedback sensitive leak signal. More specifically, the signals stored in the encoder output buffer are further encoded based on the fullness of the buffer and information about this further encoding is used in determining the leak factor level. In accordance with another improvement, this leak factor level is not constrained to granularity that is imposed by the decoder hardware. Removal of the constraint is accomplished by cycling through a sequence of permissible leak levels that averages at the desired level.

BRIEF DESCRIPTION OF THE DRAWING

FIG. 19 presents a pictorial view of the data format;

FIG. 20 illustrates the output data divisions and the compressed data slices;

DETAILED DESCRIPTION

In the design of an all-digital HDTV system for terrestrial broadcasting, difficult decisions must be made because the available bandwidth is severely limited. Because of that, an all-digital HDTV design contains various clever approaches for reducing the signal redundancy. One of those is utilizing the temporal redundancy of the image signal. That is, rather than sending the image frame, one sends the difference between the new image and the previous image, which is already known to the receiver. As indicated in the Background of the Invention section, however, a "leak signal" concept is advantageously incorporated to prevent perpetuation of noise.

In accordance with this invention, the leak signal concept is improved by having it depend on the nature of the frame signal that is being sent. When that frame signal is very different from the previous frame's signal, a large portion of the signal is leaked through for encoding. When that frame signal is not very different from the previous frame's signal, than only a small portion of the signal is leaked through. At all times, however, some signal is leaked through.

In order to appreciate the function that the leak signal improvement of this invention serves, the following describes the entire coder section of an HDTV transmitter. The principles of this invention, are primarily described in connection with the leak circuit processor 20 of FIG. 1, which depicts the forward estimation block of the encoder. FIG. 2 depicts the encoding loop itself.

Figure 1:
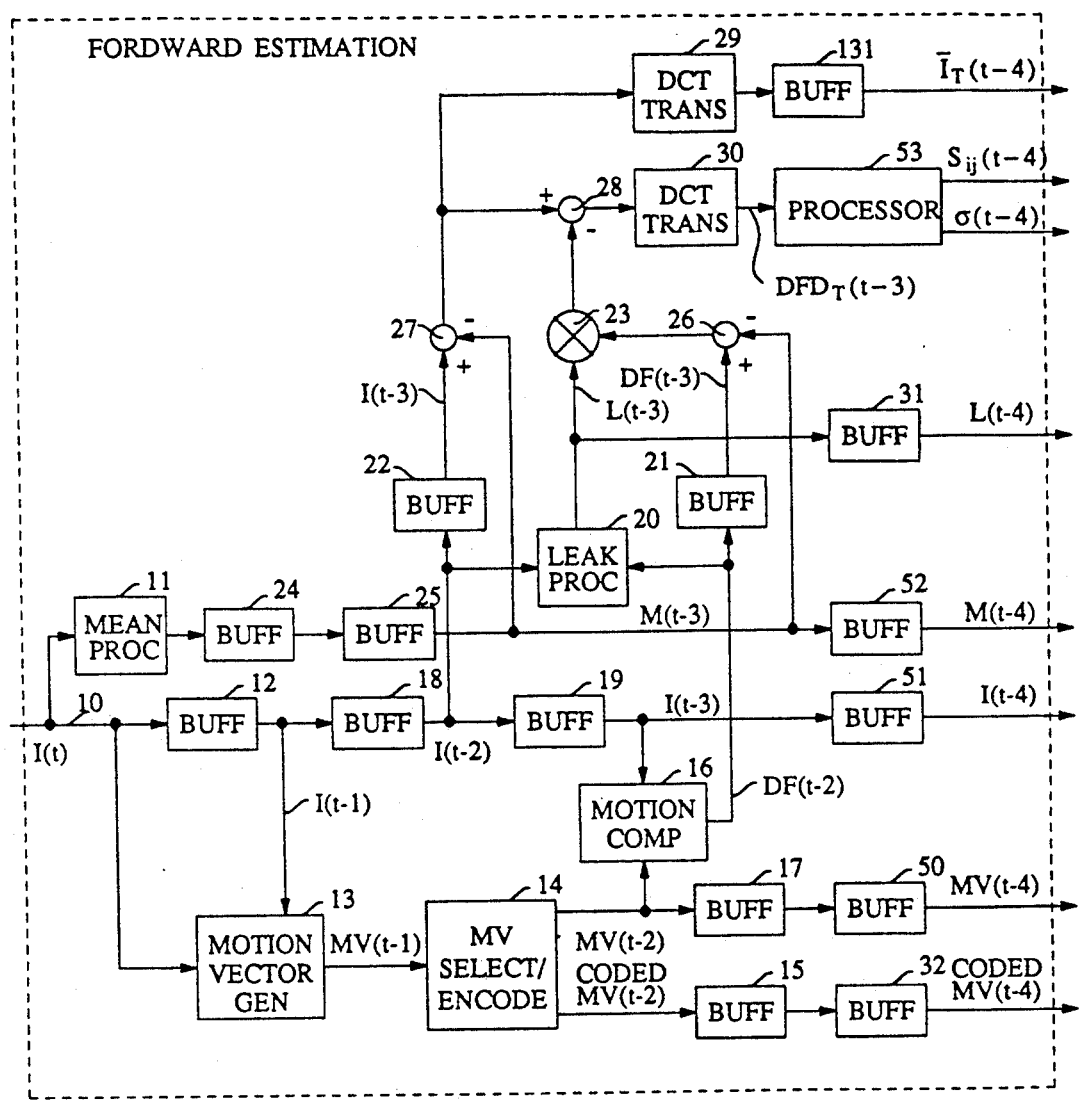
FIG. 1 presents a block diagram of a forward estimation section of an HDTV digital encoder.
Figure 2:
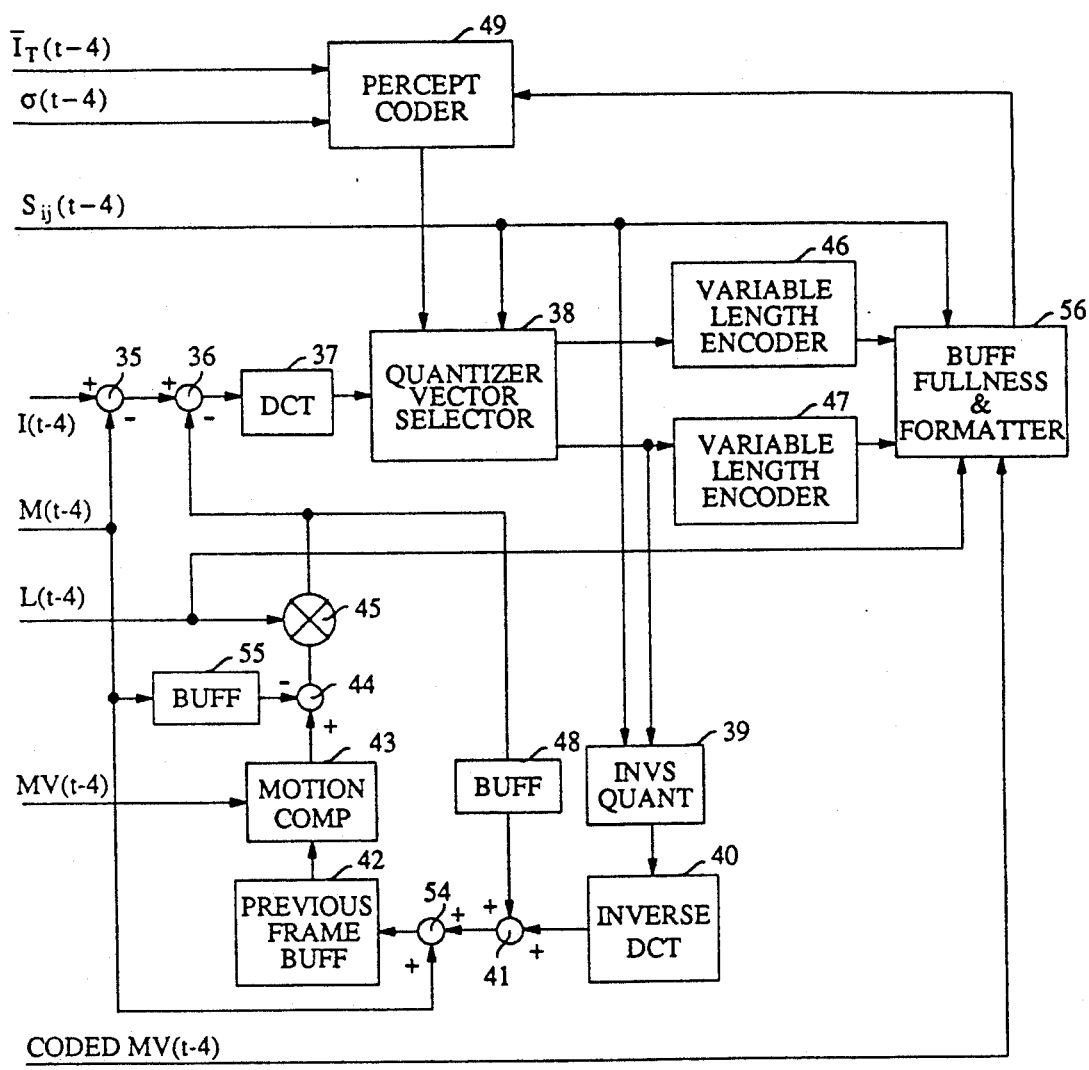
FIG. 2 presents a block diagram of an encoding loop section of an HDTV encoder that interacts with the forward estimation section of FIG. 1.
Figure 3:
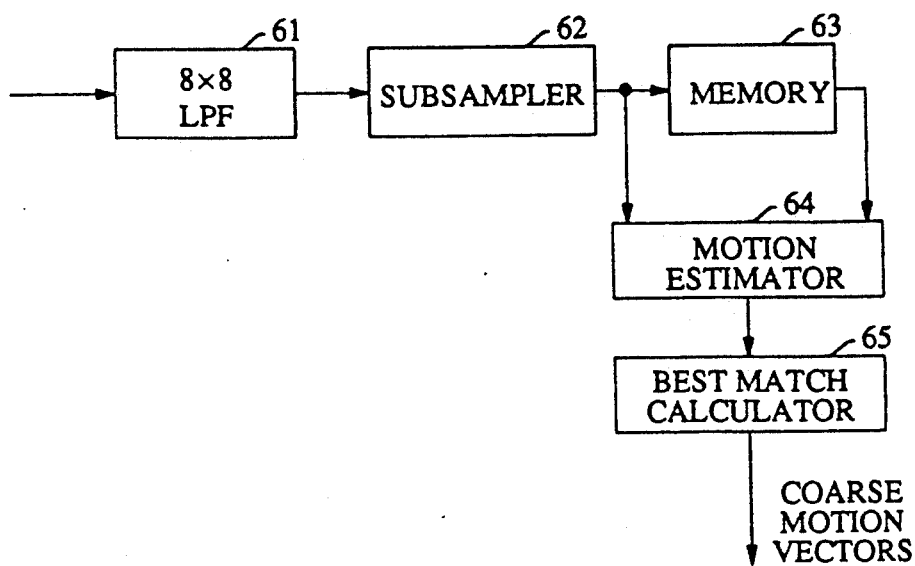
FIG. 3 depicts a hardware organization for a coarse motion vector detector.
Figure 4:
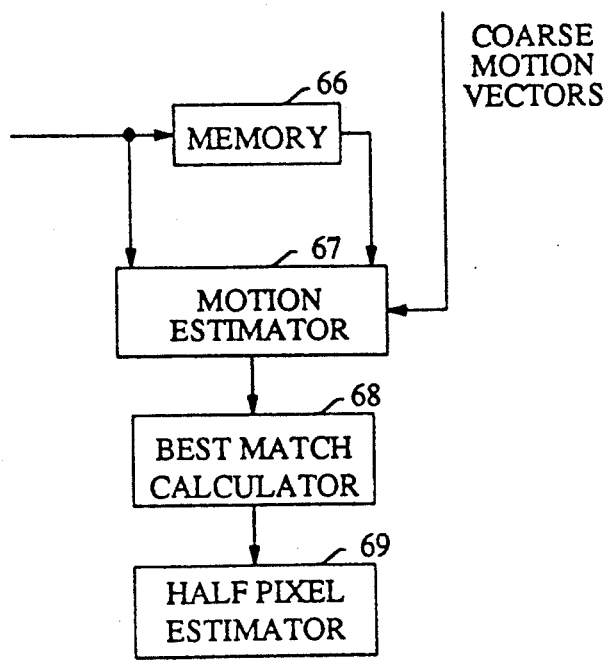
FIG. 4 depicts a hardware organization for a fine motion vector detector that takes into account the output of the coarse motion vector detector.

In FIG. 1, the input signal is applied at line 10. It is a digitized video signal that arrives in sequences of image frames. This input signal is applied to frame-mean processor 11, to buffer 12, and to motion vector generator 13. The output of buffer 12 is also applied to motion vector generator block 13. Frame-mean processor 11 develops the mean value of each incoming frame. That value is delayed in buffers 24 and 25, and applied to a number of elements within FIG. 1, as described below. It is also sent to the encoding loop of FIG. 2 through buffer 52. Motion vector generator 13 develops motion vectors which are applied to motion vector selector/encoder 14 and, thereafter, through buffers 15 and 32, wherefrom the encoded motion vectors are sent to the encoding loop of FIG. 2. The unencoded output of motion vector selector/encoder 14 is also applied to motion compensator block 16, and to buffer 17 followed by buffer 50, wherefrom the unencoded motion vectors are sent to the encoding loop of FIG. 2.

The output of buffer 12 is applied to buffer 18 and thereafter to buffers 19 and 51, wherefrom it is sent to the encoding loop of FIG. 2. The output of buffer 18 is applied to buffer 22 and to leak factor processor 20, and the output of buffer 19 is applied to motion compensator circuit 16. The output of motion compensator 16 is applied to buffer 21 and to leak factor processor 20.

The frame-mean signal of buffer 25 is subtracted from the output of buffer 21 in subtracter 26 and from the output of buffer 22 in subtracter 27. The outputs of subtracter 26 and leak processor 20 are applied to multiplier 23, and the output of multiplier 23 is applied to subtracter 28. The output of leak processor 20 is also sent to the encoding loop of FIG. 2 via buffer 31. Element 28 subtracts the output of multiplier 23 from the output of subtracter 27 and applies the result to DCT transform circuit 30. The output of transform circuit 30 is applied to processor 53 which computes scale factors $S_{ij}$ and signal standard deviation $\sigma$ and sends its results to FIG. 2. The output of subtracter 27 is applied to DCT transform circuit 29, and the output of DCT circuit 29 is sent to the encoding loop of FIG. 2.

To get a sense of the timing relationship between the various elements in FIG. 1, it is useful to set a benchmark, such as by asserting that the input at line 10 corresponds to the image signal of frame t; i.e., that the input signal at line 10 is frame I(t). All of the buffers in FIG. 1 store and delay one frame's worth of data. Hence, the output of buffer 12 is I(t-1), the output of buffer 18 is I(t-2), the output of buffer 19 is I(t-3), and the output of buffer 51 is I(t-4).

Motion vector generator 13 develops motion vectors M(t) that (elsewhere in the encoder circuit and in the decoder circuit) assist in generating an approximation of frame I(t) based on information of frame I(t-1). It takes some time for the motion vectors to be developed (an internal delay is included to make the delay within generator 13 equal to one frame delay). Thus, the output of generator 13 (after processing delay) corresponds to a set of motion vectors MV(t-1). Not all of the motion vectors that are created in motion vector generator 13 are actually used, so the output of generator 13 is applied to motion vector selector/encoder 14 where a selection process takes place. Since the selection process also takes time, the outputs of selector/encoder 14 are MV(t-2) and the CODED MV(t-2) signals, which are the motion vectors, and their coded representations, that assist in generating an approximation of frame I(t-2) based on information of frame I(t-3). Such an I(t-2) signal is indeed generated in motion compensator 16, which takes the I(t-3) signal of buffer 19 and the motion vectors of selector/encoder 14 and develops therefrom a displaced frame signal DF(t-2) that approximates the signal I(t-2). Buffers 17 and 50 develop MV(t-4) signals, while buffers 15 and 32 develop the CODED MV(t-4) signals.

As indicated above, processor 11 develops a frame-mean signal. Since the mean signal cannot be known until the frame terminates, the output of processor 11 relates to frame t-1. Stated differently, the output of processor 11 is M(t-1) and the output of buffer 25 is M(t-3).

Leak factor processor 20 receives signals I(t-2) and DF(t-2). It also takes time to perform its function (and internal delay is included to insure that it has a delay of exactly one frame), hence the output signal of processor 20 corresponds to the leak factor of frame (t-3). The output of processor 20 is, therefore, designated L(t-3). That output is delayed in buffer 31, causing L(t-4) to be sent to the encoding loop.

Lastly, the processes within elements 26–30 are relatively quick, so the transformed image ($\bar{I}_T$) and displaced frame difference ($DFD_T$) outputs of elements 29 and 30 correspond to frame $I_T$ (t-3) and $DFD_T$ (t-3), respectively, and the output of processor 53 corresponds to $S_{ij}$ (t-4) and $\sigma$ (t-4).

FIG. 2 contains the encoding loop that utilizes the signals developed in the forward estimation section of FIG. 1. The loop itself comprises elements 36, 37, 38, 39, 40, 41, 54, 42, 43, 44 and 45. The image signal I(t-4) is applied to subtracter 36 after the frame-mean signal M(t-4) is subtracted from it in subtracter 35. The signal developed by subtracter 36 is the difference between the image I(t-4) and the best estimation of image I(t-4) that is obtained from the previous frame's data contained in the encoding loop (with the previous frame's frame-mean excluded via subtracter 44, and with a leak factor that is introduced via multiplier 45). That frame difference is applied to DCT transform circuit 37 which develops 2-dimensional transform domain information about the frame difference signal of subtracter 36. That information is encoded into vectors within quantizer-and-vector-selector (QVS) 38 and forwarded to encoders 46 and 47. The encoding carried out in QVS 38 and applied to encoder 47 is reversed to the extent possible within inverse quantizer 39 and applied to inverse DCT circuit 40.

The output of inverse DCT circuit 40 approximates the output of subtracter 36. However, it does not quite match the signal of subtracter 36 because only a portion of the encoded signal is applied to element 39 and because it is corrupted by the loss of information in the encoding process of element 38. There is also a delay in passing through elements 37, 38, 39, and 40. That delay is matched by the delay provided by buffer 48 before the outputs of buffer 48 and inverse DCT transform circuit 40 are combined in adder 41 and applied to adder 54. Adder 54 adds the frame-mean signal M(t-4) and applies the results to buffer 42. Buffer 42 complements the delay provided by buffer 48 less the delay in elements 43, 44 and 45 (to form a full one frame delay) and delivers it to motion compensator 43.

Motion compensator 43 is responsive to the motion vectors MV(t-4). It produces an estimate of the image signal I(t-4), based on the approximation of I(t-5) offered by buffer 42. As stated before, that approximation is diminished by the frame-mean of the previous frame, M(t-5), through the action of subtracter 44. The previous frame's frame-mean is derived from buffer 55 which is fed by M(t-4). The results of subtracter 44 are applied to multiplier 45 which multiplies the output of subtracter 44 by the leak factor L(t-4). The multiplication results form the signal to the negative input of subtracter 36.

It may be noted in passing that the action of motion compensator 43 is linear. Therefore, when the action of buffer 42 is also linear—which means that it does not truncate its incoming signals—then adder 54 and subtracter 44 (and buffer 55) are completely superfluous. They are used only when buffer 42 truncates its incoming signal to save on the required storage.

Figure 17:
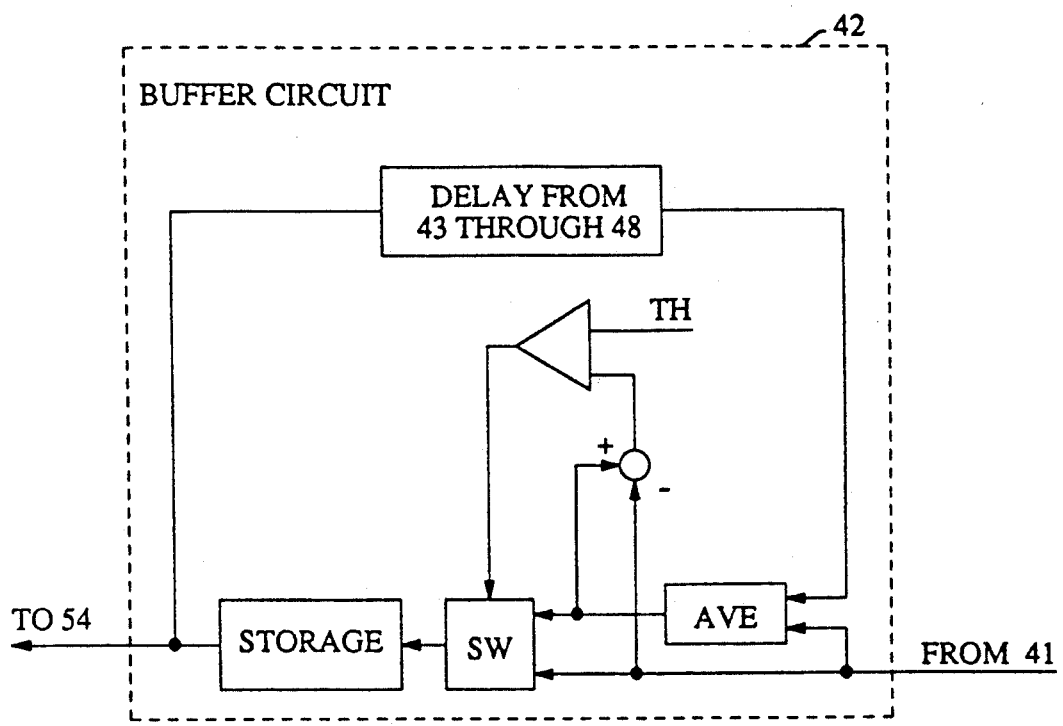
FIG. 17 is a frame buffer circuit that includes a measure of temporal filtering.

In connection with buffer 42, another improvement is possible. When the processing within elements 36, 37, 38, 39, and 40 and the corresponding delay of buffer 48 are less than the vertical frame retrace interval, the output of buffer 42 can be synchronized with its input, in the sense that pixels of a frame exit the buffer at the same time that corresponding pixels of the previous frame exit the buffer. Temporal filtering can then be accomplished at this point by replacing buffer 42 with a buffer circuit 42 as shown in FIG. 17. In buffer circuit 42, the incoming pixel is compared to the outgoing pixel. When their difference is larger than a certain threshold, the storage element within circuit 42 is loaded with the average of the two compared pixels. Otherwise, the storage element within buffer 42 is loaded with the incoming pixel only.

QVS 38 is also responsive to perceptual coder 49 and to $S_{ij}$ (t-4). That coder is responsive to signals $\bar{I}_T$ (t-4) and $\sigma$(t-4). Signals $S_{ij}$(t-4) are also sent to inverse quantization circuit 39 and to buffer fullness and formatter (BFF) 56. BFF block 56 also receives information from encoders 46 and 47, the leak signal L(t-4) and the CODED MV(t-4) information from buffer 32 in FIG. 1. BFF block 56 sends fullness information to perceptual coder 49 and all if its received information to subsequent circuitry, where the signals are amplified, appropriately modulated and, for terrestrial transmission, applied to a transmitting antenna.

BFF block 56 serves two closely related functions. It packs the information developed in the encoders by applying the appropriate error correction codes and arranging the information, and it feeds information to perceptual coder 49, to inform it of the level of output buffer fullness. The latter information is employed in perceptual coder 49 to control QVS 38 and inverse quantizer 39 and, consequently, the bit rate of the next frame.

The general description above provides a fairly detailed exposition of the encoder within the HDTV transmitter. A more detailed description of the various encoder elements is found in the aforementioned '475 patent and is, therefore, generally not repeated here. It is however, incorporated by reference herein. Still, for the sake of clarity, some of the information is repeated to make this invention clearer and thereby easier to understand and use.

Leak Circuit

The leak circuit comprises leak processor 20 and multiplier 23. Multiplier 23 modifies the signals of motion compensator circuit 16 prior to their application to subtracter 28. Subtractor 26 excludes the mean signal from consideration, in an effort to reduce the dynamic range of the signals considered in DCT transform circuits, 29 and 30.

The processing within element 20 takes some time, of course, and therefore, FIG. 1 includes buffers 21 and 22. Buffer 22 delays the image signal applied to subtracter 28, and buffer 21 delays the motion vector signals sent by motion compensator circuit 16.

Directing attention to leak processor 20, one way to look at the leak circuit is as a mechanism for reducing the DFD (displaced frame difference) developed at the output of subtracter 28. The entire effort of developing good motion vectors, therefore, is to reduce the DFD out of subtracter 28. To the extent that the leak circuit can reduce the DFD further, its employment is beneficial.

One way to reduce the DFD is to minimize the DFD as a function of the leak variable $\alpha$. That is, the need is to determine $\alpha$ such that $$\frac{\partial E\{(I - \alpha DF)^2\}}{\partial \alpha} = 0. \tag{1}$$

where I is the image frame signal of buffer 18, DF is the displaced frame signal of motion compensator circuit 16, $\alpha$ is the multiplicative leak value, and E{X} is the expected value of X. The solution to the above equation is $$\alpha = \frac{E\{I \cdot DF\}}{E\{DF^2\}}. \tag{2}$$

Thus, one embodiment for processor 20 merely computes $\alpha$, in accordance with equation (2) in response to signals I(t-2) and DF(t-2). The computations performed in processor 20, in such a case, are simple multiplications and averaging (sum and divide), so they are not described any further herein. Suffice it to state that processor 20 may be a conventional arithmetic processor (e.g., a DSP integrated circuit).

Although the calculations performed in processor 20 are straight forward, they are still rather numerous (though not anywhere near as numerous as the calculations needed for selecting the motion vectors). A somewhat simpler calculation task can be assigned to processor 20 by observing the following.

Considering the limits to which the leak factor should be subjected, it is clear, for example, that the leak factor cannot be allowed to reach and stay at 1.0. Some leak of the actual image must always (over a broad time span) be present. Otherwise, a receiver that freshly tunes to the transmitter cannot construct the image signal because it lacks all historical information; i.e., it never has the correct "previous frame" information to which the motion vectors can be successfully applied. Also, a noise accepted by the receiver would never disappear. Thus, a maximum level must be set on the long term value of the leak factor; such as 15/16.

It is also clear that when there is a scene change, a leak factor of value 0 is best, because it completely discards the old scene and begins to build a new one. It may be noted that scene changes are relatively frequent in commercial TV programs. Setting $\alpha$ to 0 also helps in capturing the necessary historical information for freshly tuned-in receivers and for receivers who have corrupted historical information because of noise. Of course, the value of $\alpha$ should not be maintained at 0 for too long because that creates a heavy transmission burden.

In view of the above, in its simpler form, the process carried out by processor 20 need only determine the occurrence of a scene change and set $\alpha$ to 0 at every such occurrence. Thereafter, $\alpha$ may be incremented at a preselected rate with every frame so that after m frames, the value of $\alpha$ is allowed to reach $\alpha_{max}$ (e.g., 15/16). Of course, if there is another scene change within the m frames, $\alpha$ is again reset to 0 and the incrementing is restarted.

Figure 7:
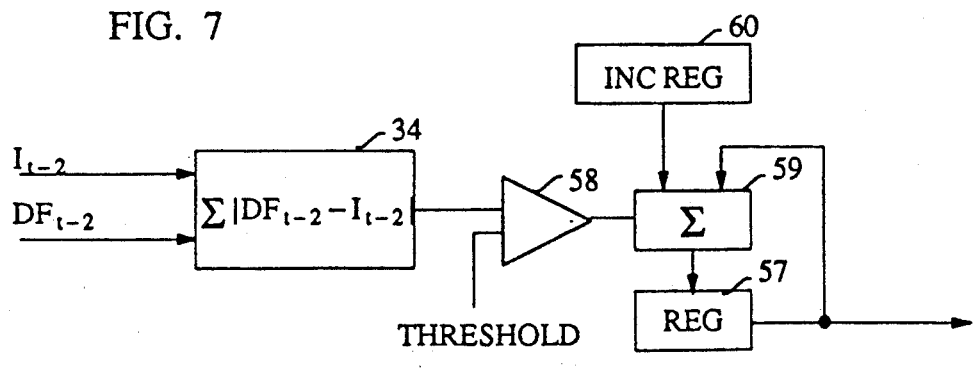
FIG. 7 presents one embodiment for evaluating a leak factor, $\alpha$.
Figure 8:
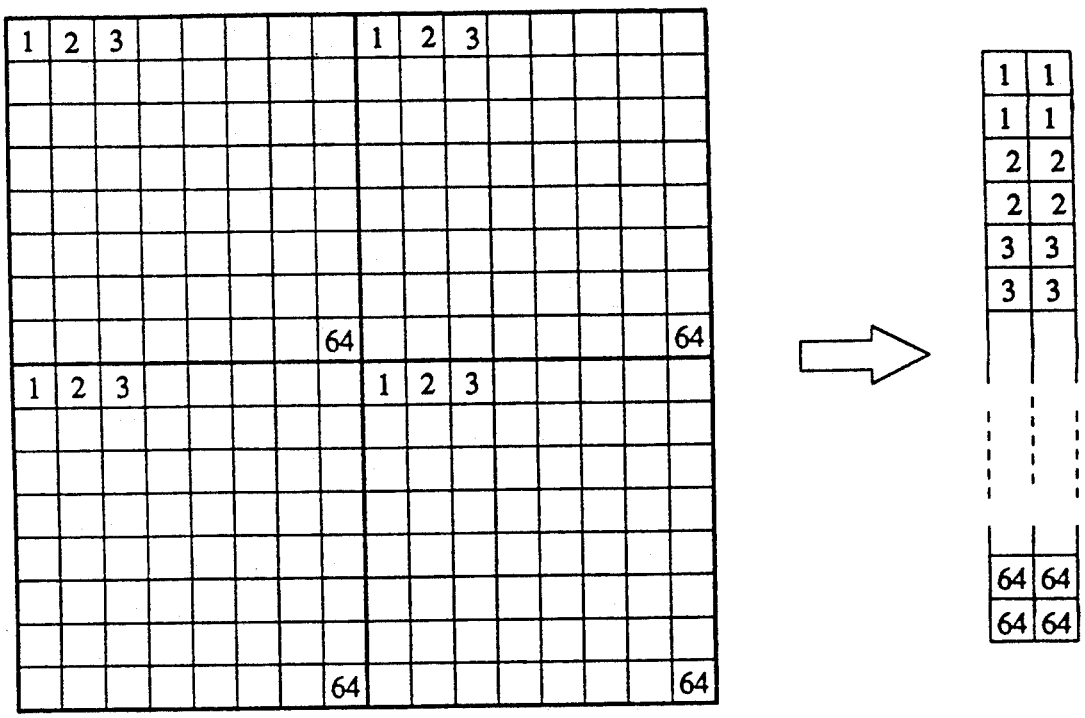
FIG. 8 illustrates the arrangement of a superblock that is quantized in QVS 38 block of FIG. 2.
Figure 9:
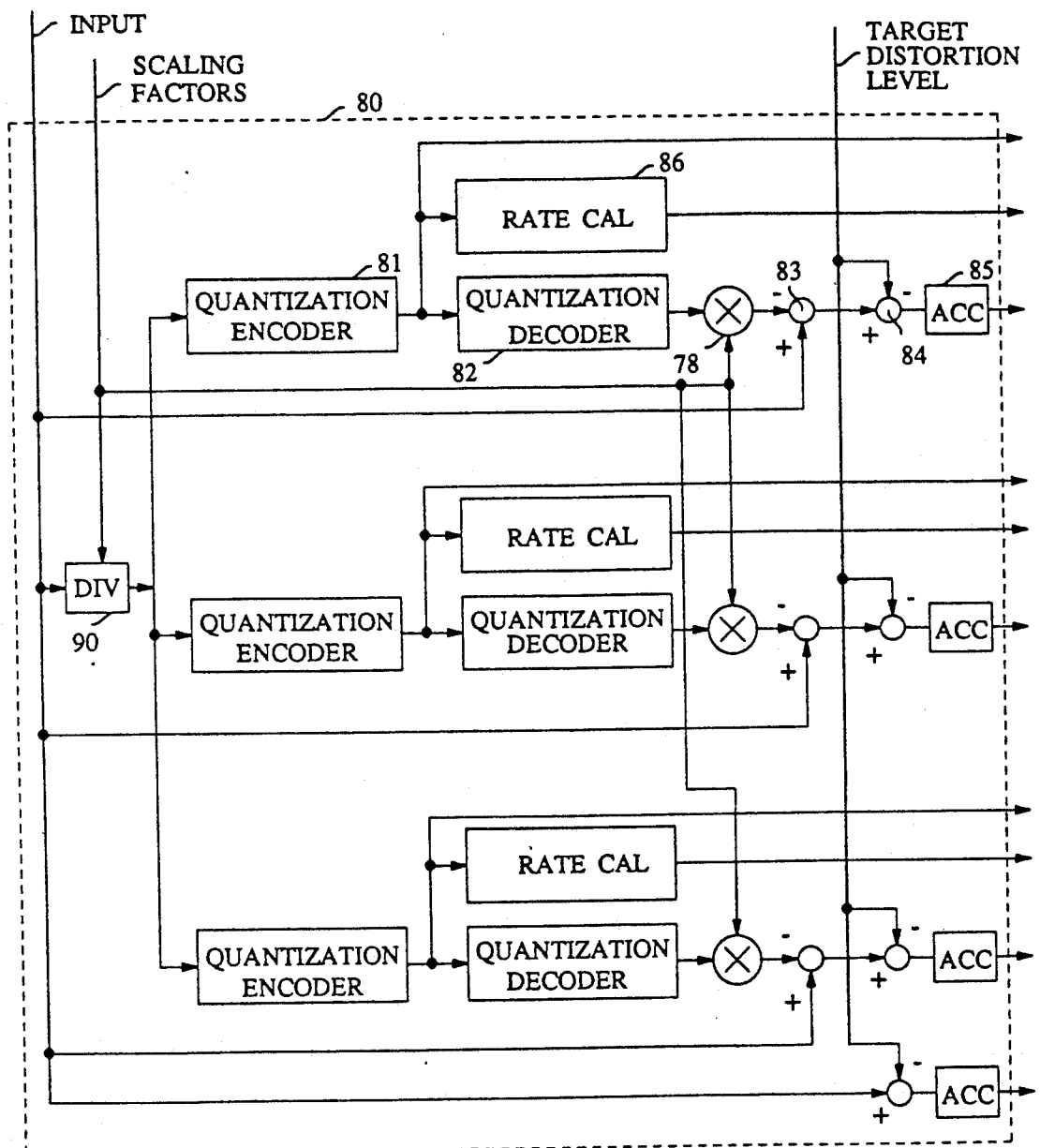
FIG. 9 depicts how a set of selection error signals is calculated in preparation for codebook vector selection.

This simple approach for developing $\alpha$ can be implemented simply with a scene-change determining circuit, and an accumulator. The scene-change determining circuit may simply be a circuit that adds the magnitudes of the displaced frame difference signals; i.e., $\Sigma|I_{t-2}-DF_{t-2}|$. That provides a measure that, when compared to a threshold, determines whether a scene change has occurred. This is depicted in FIG. 7 where element 34 develops the sum signal $\Sigma|I_{t-2}-DF_{t-2}|$ and applies this signal to threshold circuit 58. The output of circuit 58 is applied to a disable lead of adder 59, which adds the value in threshold register 60 to the value in register 57. The output of register 57 is the leak factor, $\alpha$.

A still another approach is to employ a fixed leak at the input to multiplier 23, and to develop a two level leak factor thereafter. By placing a processor 53 at the output of DCT transform 29 (in addition to the processor 53 at the output of DCT transform 30) two $\sigma(t-4)$ signals are developed.

The leak factor that is sent to the encoding loop of FIG. 2 is selected based upon the two $\sigma(t-4)$ signals developed. When there is a scene change, the two $\sigma$ signals will not differ much because the frame will have a poor prediction, resulting in a high value of the DFD standard deviation. In fact, the deviation of the DFD might even be higher than the standard deviation of the original frame. In such a case (i.e., when the two $\sigma$ signals differ by more than a chosen threshold), it is clear that a leak of 1 (no prediction) is to be selected and, accordingly, the leak factor $\sigma=0$ is sent to FIG. 2. When the two $\sigma$ signals do differ by more than the chosen threshold, then a fixed leak factor, such as $\sigma=15/16$ is sent to FIG. 2.

Figure 16:
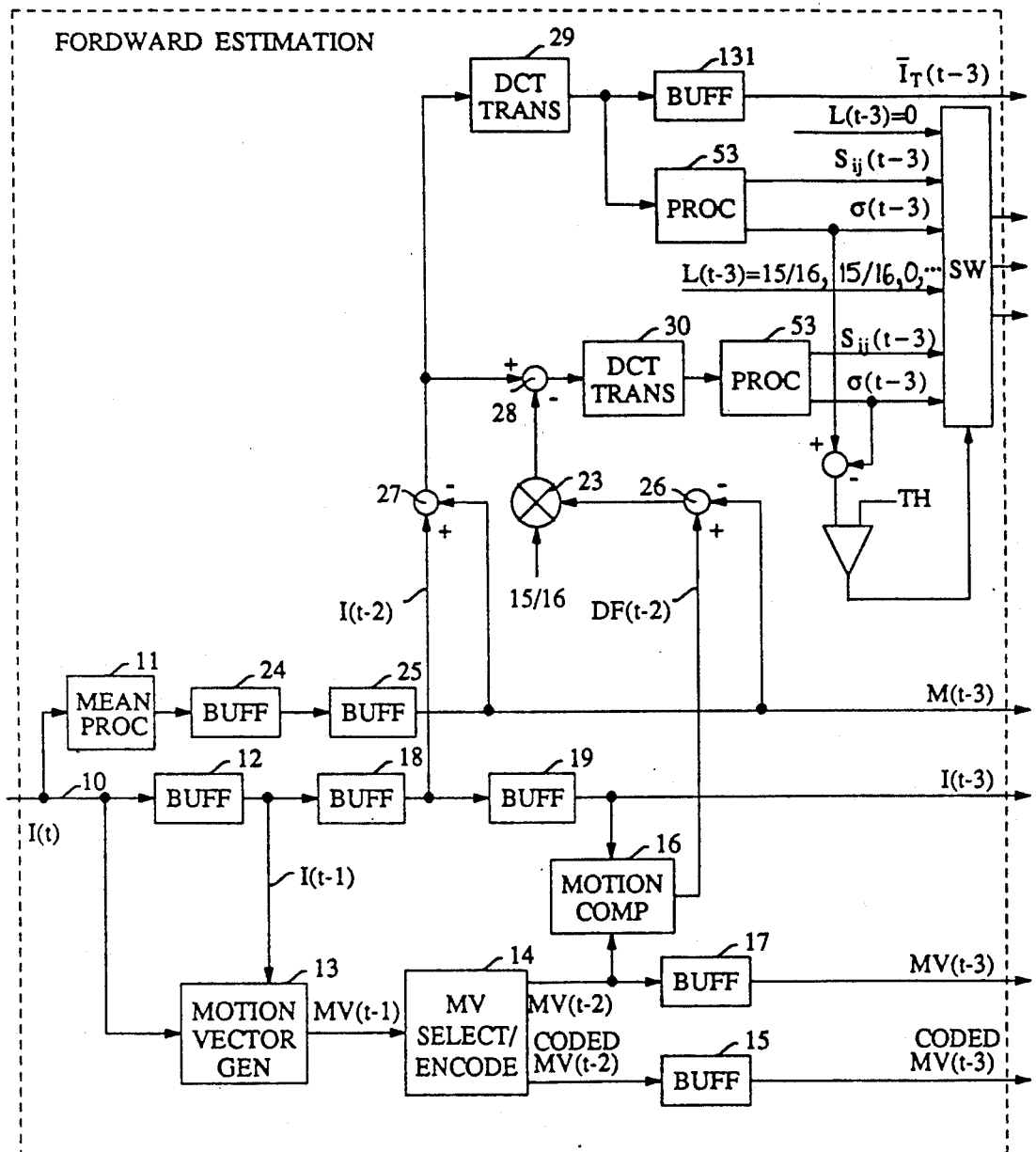
FIG. 16 presents a modified forward estimation block that choses a leak factor from a set of two fixed leak factors.

The block diagram of the forward estimation section of the encoder (i.e. FIG. 1), can be simplified somewhat by adopting this leak approach. This is shown in FIG. 16, where processor 20 is dropped, together with a number of buffers. On the other hand, a processor 531 was added, responsive to DCT transform circuit 29, a subtracter 532 responsive to processors 53 and 531, a threshold device 533, and a selector 534 that selects one of two sets of scale factors and standard deviation measures and either a leak factor of 0 or 15/16.

Buffer Control

The buffer control within the encoder of FIG. 2 is based upon modifying a frame-wide target distortion within QVS 38. If the buffer fills up to a point higher than some reference level, a larger target distortion is set to allow the buffer to lower its occupancy level. On the other hand, if the buffer fullness is lower than the reference level, then a lower target distortion is set.

Given a certain buffer fullness $B_t$ the desired buffer fullness for the next frame can be formulated as $$B_{p+1}=B_{ref}+(B_p-B_{ref})\times k_0, \tag{3}$$

where $B_{ref}$ is the desired level of buffer fullness, $B_p$ is the buffer fullness at frame p, and $k_0$ is a buffer control parameter which is constant, $$0<k_0<1. \tag{4}$$

But, $$B_{p+1}=B_p+R_{p+1}-R_{CH}. \tag{5}$$

where $R_{p+1}$ is the number of bits coming into the buffer at frame $p+1$, and $R_{CH}$ is the number of bits (channel capacity) that leave the buffer with each frame.

We have determined experimentally that one good target rate for a chosen distortion level D, $R_T(D)$, can be calculated (using the t-4 frame reference in FIG. 2) and where T stands for "target", in accordance with equation 6.

$$R_T(D_T) = a + b \log\left(\frac{D_T}{\sigma_{t-4}}\right) \tag{6}$$

where the standard deviation $\sigma$ is computed in processor 53 (FIG. 1) and parameters a and b are computed from the two previous frames by $$b = \min\left(b_{max}, \frac{R_{t-5} - R_{t-6}}{\log\left(\frac{D_{t-5}}{\sigma_{t-5}}\right) - \log\left(\frac{D_{t-6}}{\sigma_{t-6}}\right)}\right) \tag{7}$$

and $$a = R_{t-5} - b \cdot \log\left(\frac{D_{t-5}}{\sigma_{t-5}}\right). \tag{8}$$

The minimization operation in equation 7 is included merely to avoid instabilities for small values of the denominator. Using equations 6, 7 and 8, the target distortion is $$D_T = \sigma_{t-4} e^{\frac{(R_T-a)}{b}}. \tag{9}$$

Replacing the rate, $R_T$ in equation 9 with the buffer fullness measures (with the aid of equation 5), yields $$D_T = \sigma_{t-4}\left(\frac{D_{t-5}}{\sigma_{t-5}}\right)e^{\frac{\{(B_t-5-B_{ref})\times k_0 + (B_t-5-B_t-6)\}}{-b}} \quad (10)$$

The computation of equation 10 is performed in processor 91. It requires the constant $k_o$, the constant $B_{ref}$, the current frame's $\sigma$ value ($\sigma_{t-4}$), the previous frame's D value, $\sigma$ value and B value (D(t-5), $\sigma$(t-5), and B(t-5)), and the B value before that (i.e., B(t-6)). The sigma values come from processor 53 (FIG. 1) and the B values come from BFF block 56. Of course, the various delayed images of B and $\sigma$ are obtained with appropriate registers within processor 91. The exponentiation and other computations that are called for by equation 10 can be either computed or derived from a look-up table.

Figure 10:
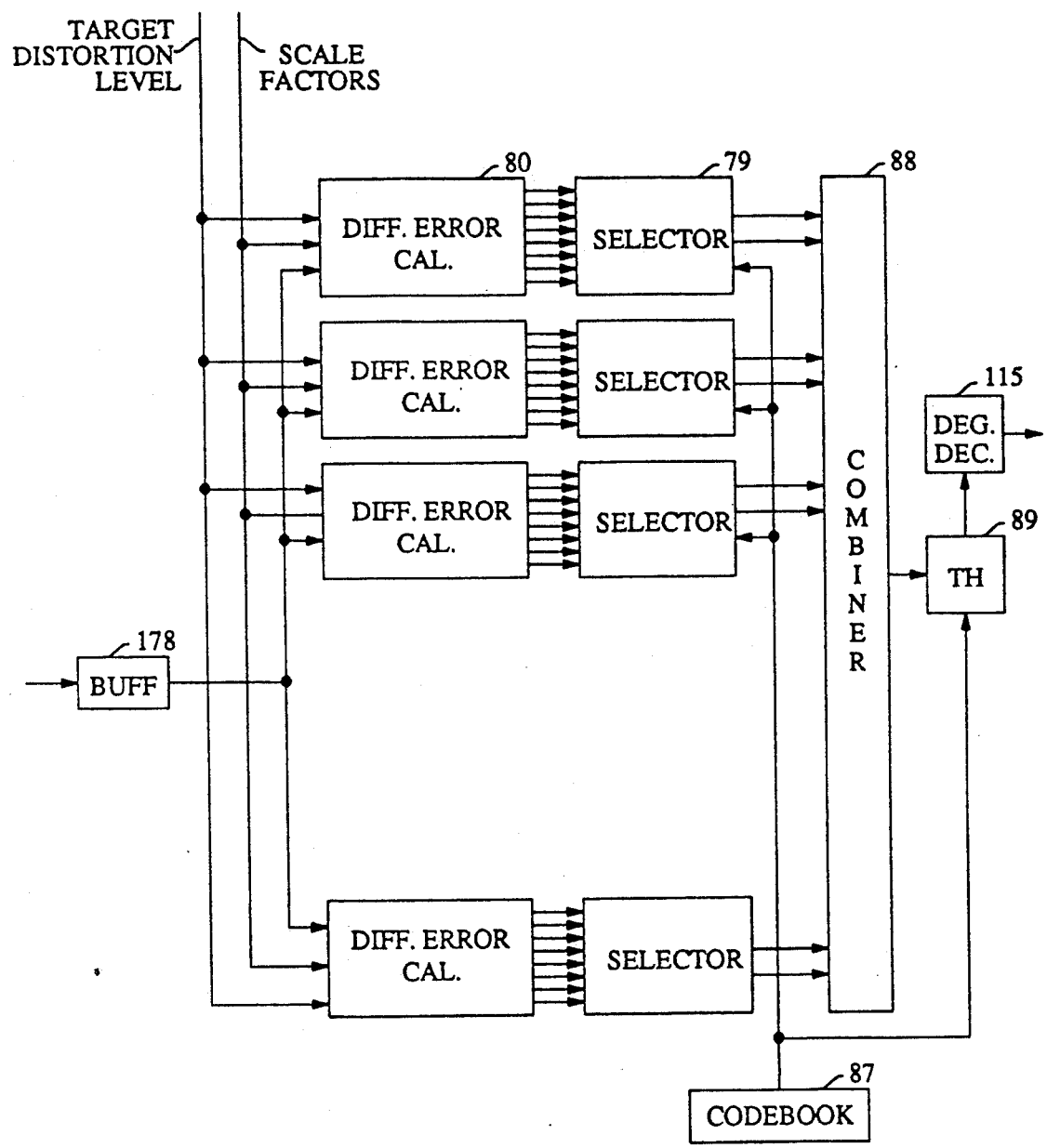
FIG. 10 presents a block diagram of QVS block 38.

The D value developed by processor 91 is applied to multiplier 92 to alter the perceptual thresholds developed in block 93. The altered perceptual threshold signals are applied, as described above, to selectors 79 in FIG. 10.

Buffer Fullness and Formatter 56

As indicated above, buffer fullness circuit 56 needs to supply perceptual coder 49 with the information on buffer fullness. Of course, that implies that block 56 includes a buffer which is filled. That indeed is the case. BFF block 56 accumulates the various segments of data that must be transmitted and forwards that data to modulation circuitry, power amplification circuitry, and the transmitting antenna.

Figure 5:
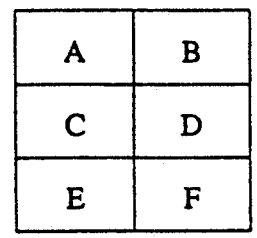
FIG. 5 illustrates the spatial relationship of what is considered a "slice" of image data.
Figure 6:
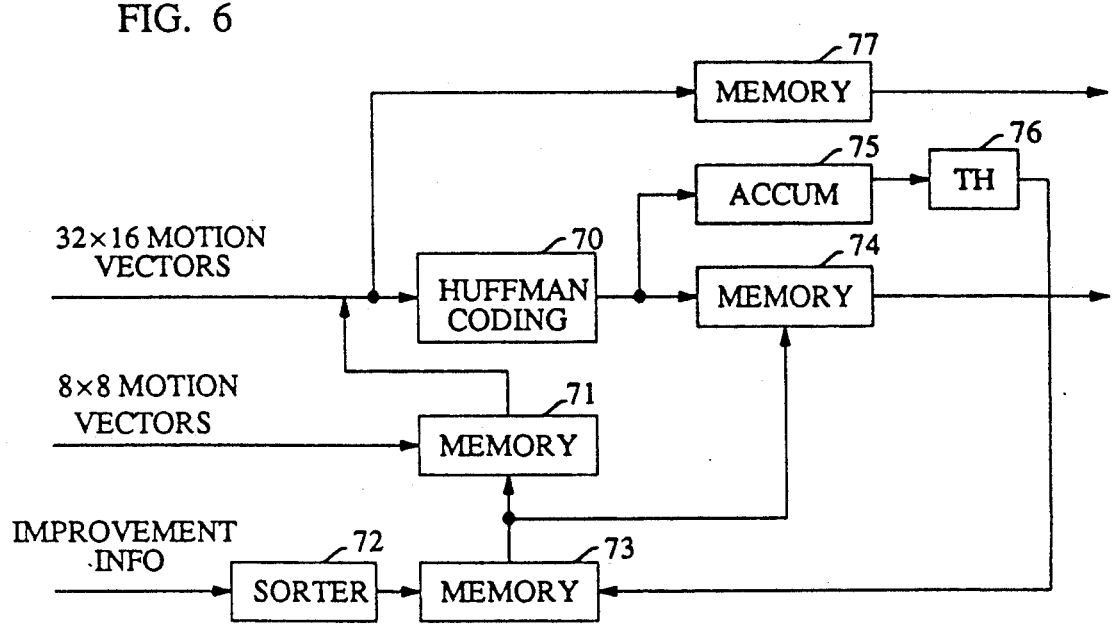
FIG. 6 shows one way for selecting a mix of motion vectors to fit within a given bit budget.

To recap block 56 accepts the following signals:
1. The coded motion vectors CODED MV(t-4). These are a collection of Huffman coded packets, where each packet describes the motion vectors of a slice, as described in detail in connection with FIGS. 5 and 6.
2. Leak factor signals L(t-4).
3. Scaling factors $S_{ij}$.
4. Coded information from encoder 47, which is the identity of the codebook vectors selected from codebook 87, and the quantized superblock vectors.
5. Coded information from encoder 46 (much like information from encoder 47).

As indicated above, the encoded information of encoder 47 is considered more important than the encoded information of encoder 46 and accordingly, only after the encoded information of encoder 47 is accepted and there is room left in the buffer of block 56, will the information of encoder 46 be considered for inclusion. However, even with respect to the information of encoder 47, the buffer of block 56 is filled with the more important information first. Buffer underflow in BFF 56 is handled by delivering dummy data to the following circuitry, in order to maintain a constant bit rate into the channel. This highly unlikely event is easily handled by simply retransmitting the data at the buffer's 0 address.

Buffer overflow is handled by simply not transmitting data that doesn't fit into the buffer, in which case it is advisable to drop the least significant data first. By "drop" we mean not transmit some of the data that is in the buffer and empty the buffer for the next frame's data, and not load the buffer with new data that is of low importance. Of course, the buffer fullness measurement in combination with the perceptual thresholds are combined in perceptual block 49 to form a global target distortion level that will allow the output buffer of block 56 to be populated with all of the data that is generated; including the data of encoder 46. The primary consequence of the encoding within encoder 46 is to allow more sophisticated encoding in the data of encoder 47 which, in turn, enhances the receivability of those signals.

The information received from sources other than encoder 46 need to be transmitted in a manner that is likely to be received correctly. That means that the formatter section of block 56 must encode the information is a manner that will ensure that. This can be accomplished with conventional coder means that incorporates error correcting codes. The signals derived from other than encoder 46 are encoded with powerful error correcting codes, while the signals received from encoder 46 are encoded with less powerful error correcting codes or perhaps no error correcting codes.

In a copending application Ser. No. 07/611,225 now U.S. Pat. No. 5,164,963 a system is disclosed for encoding signals using the concepts of code constellations. Code constellations can be formed with some codes in the constellations having a large Hamming distance from all other codes, while other codes in the constellations have a smaller Hamming distance from other codes. The principles of such coding can be advantageously incorporated within the formatter section of block 56, or in circuitry beyond block 56 to achieve the goals of graceful degradation.

HDTV Receiver's decoder

Figure 15:
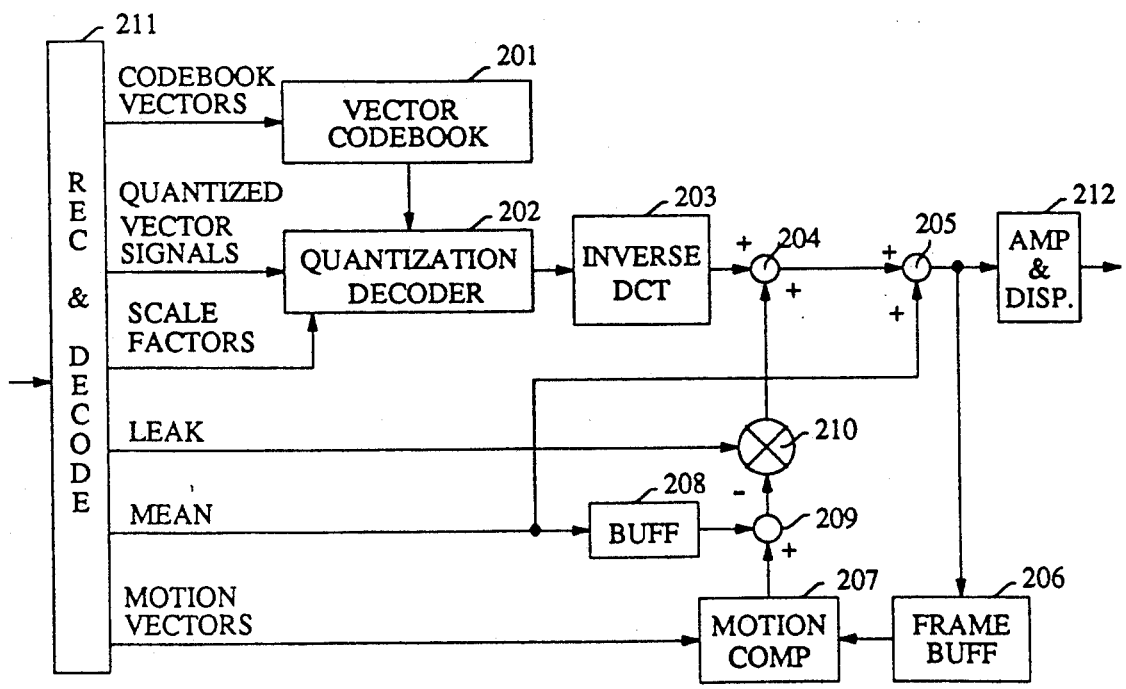
FIG. 15 presents a block diagram of a digital HDTV receiver.

FIG. 15 presents a block diagram of an HDTV receiver that conforms to the HDTV transmitter encoder described above. It receives the signal, e.g., from an antenna, and decodes in block 211 to yield the signals loaded into BFF block 56 within the transmitter. These signals are the codebook vector identifiers, the quantized superblock vector signals, the leak factors, the scaling factors, the frame means, and the motion vectors. The receptions of these signals, their separation from the combined received signal, the error code verifications, and the decoding of the variable length codes are all performed in block 211.

Figure 11:
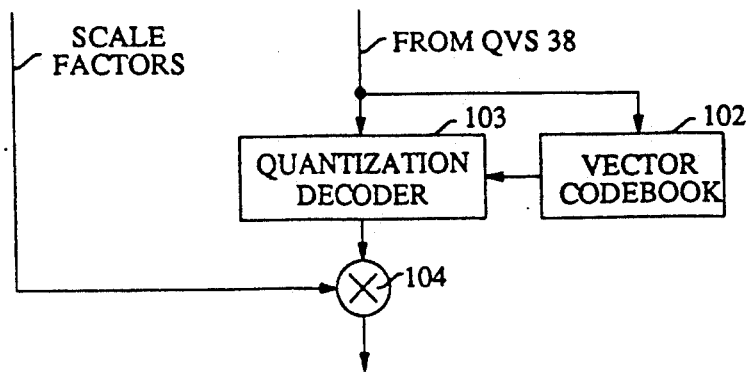
FIG. 11 is a block diagram of inverse quantization block 39.
Figure 12:
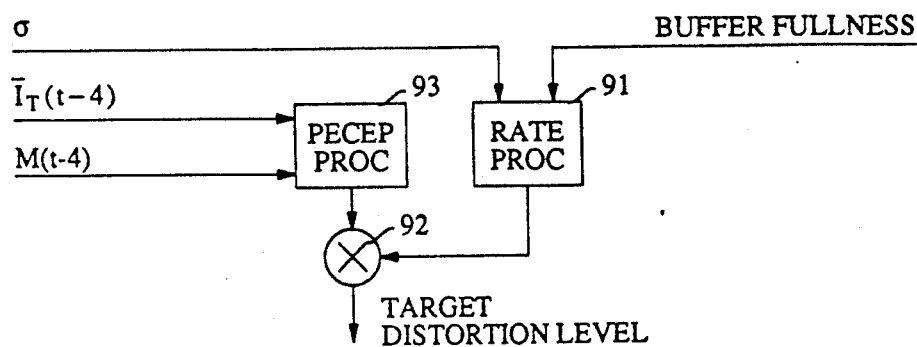
FIG. 12 presents the structure of perceptual coder 49.
Figure 13:
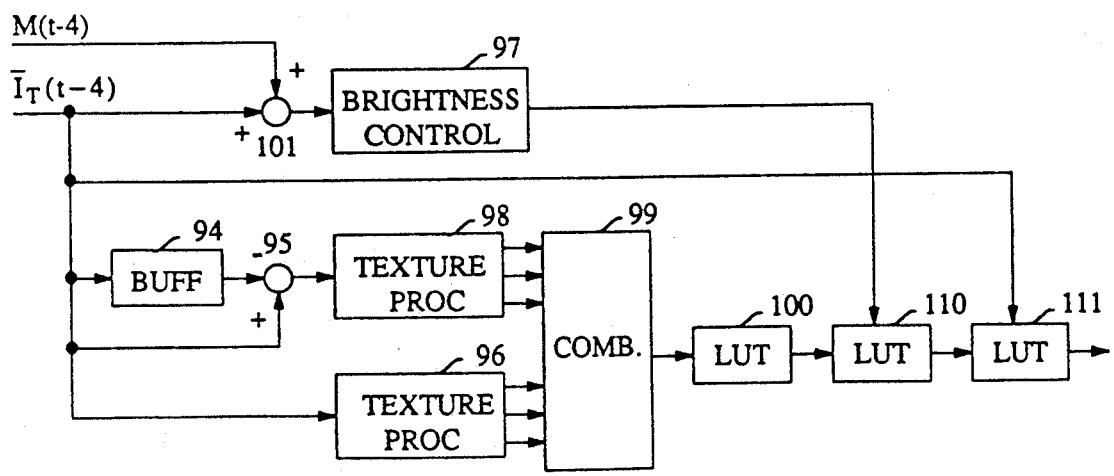
FIG. 13 illustrates the structure of perceptual processor 93.
Figure 14:
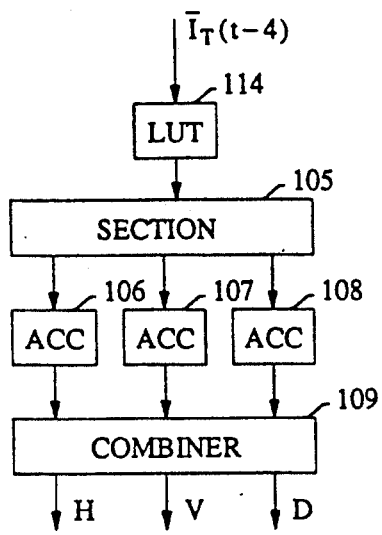
FIG. 14 is a block diagram of texture processors 96 and 98.

The processing in the decoder begins with the codebook vector identifiers applied to a codebook vector 201, and the quantized vector signals and the scale factors applied to quantization decoder 202. Blocks 201 and 202 correspond to blocks 102 and 103, respectively, of FIG. 11, and together they form an inverse quantization element akin to element 39 of FIG. 2. As in FIG. 2, the output of the inverse quantization element is applied to an inverse DCT transform circuit (in FIG. 15, this is circuit 203); and that output is combined in adder 204 with signals already stored in the decoder.

Since the quantized vector signals of a frame were created from image signals with the frame mean deleted, the output of adder 204 is missing the frame mean. This is remedied in adder 205, which adds the frame mean. The output signals of adder 205 form the frame output of the HDTV receiver's decoder. This output is applied to amplifier-and-display circuit 212 and to frame buffer circuit 206, where one frame's worth of information is stored. For each frame that is stored in buffer circuit 206, buffer circuit 206 outputs the previous frame. The previous frame signal is augmented in motion compensation block 207 which, in response to the applied motion signals, forms an estimate of the current frame. Motion compensation block 207 is identical to motion compensation block 43 in FIG. 2. The frame mean is subtracted from the output of motion compensation block 207 by subtracting therefrom the previous frame's mean in subtracter 209. The previous frame's mean is obtained from buffer 208, into which the current frame's mean is inserted. Finally, the output of subtracter 209 is applied to multiplier 210, which multiplies that signal by the leak factor signal. The output of multiplier 210 is the signal that is employed in adder 204 as described above.

An HDTV Modulation Format

Figure 18:
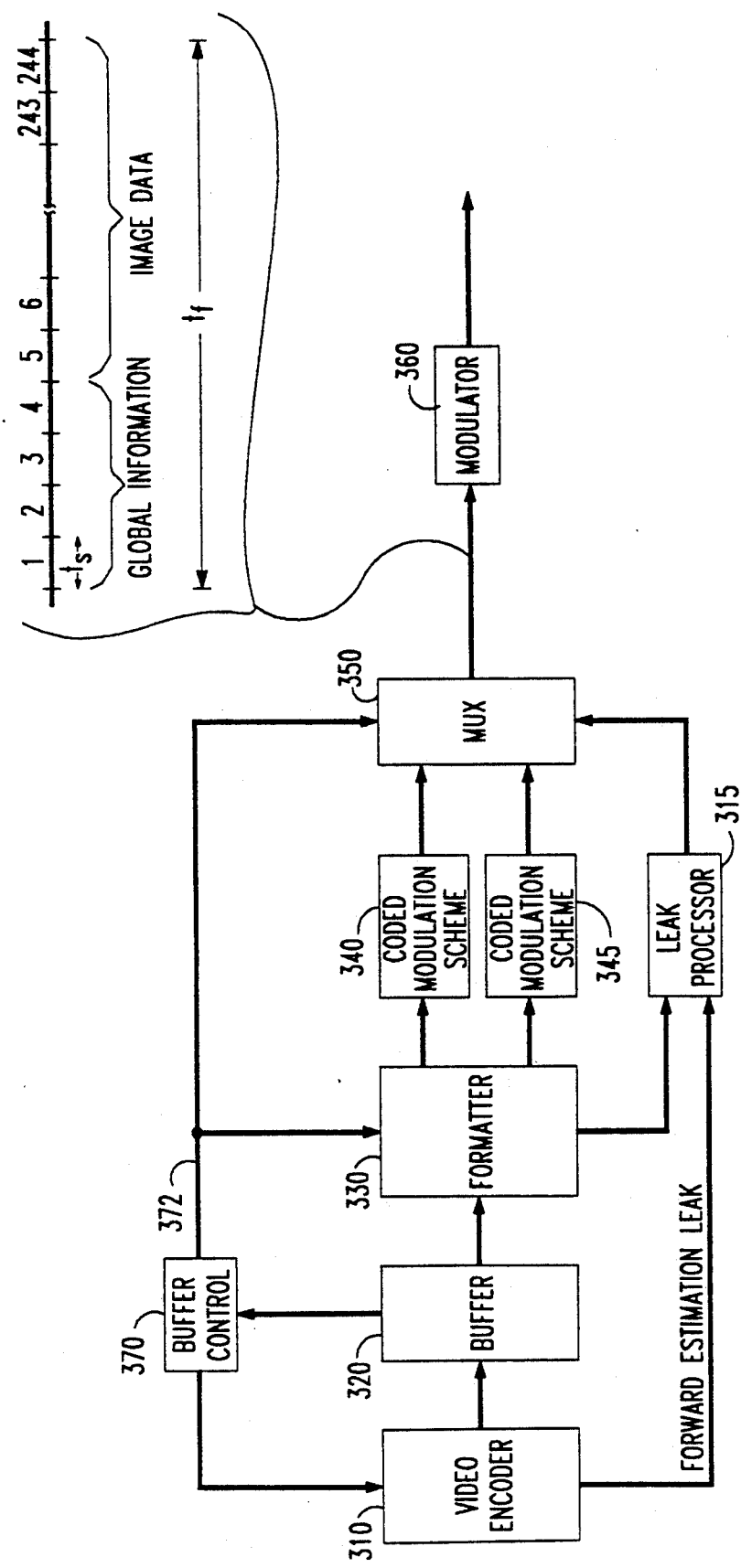
FIG. 18 presents a different output section of the encoder, accentuating a soft coding of the compressed signals developed by the video encoder.

FIG. 18 shows a slightly different output arrangement of the FIG. 2 encoder, where variable encoders 46 and 47 are replaced with coded modulation blocks 340 and 345 that follow buffer 320. In the FIG. 18 arrangement, most of the FIG. 1 and 2 encoder elements are included in element 310, and the output of element 310 is applied to buffer 320. As described above and in response to information from buffer 320, buffer control circuit 370 generates a control signal that affects the encoder. A modulation scheme control is also applied (via line 372) to formatter 330 and multiplexer 350. Buffer 320 is included in the arrangement because the quantity of data provided by encoder 310 varies with the complexity of the encoded image, whereas the data at the output of modulator 360 ideally should have a fixed symbol rate.

FIG. 19 presents one high definition television (HDTV) format that can be developed in formatter 330 and sent to modulation elements 340 and 345. In accordance with one aspect of the format (at the bottom of FIG. 19), there exist multiple field time intervals, each of which corresponds to the frame interval of a video camera and is approximately 1/60th of a second (specifically 1/59.94 of a second). In accordance with another aspect of the format, there is the compressed video frame information, which corresponds to the data generated from a frame of the camera's output signal. Each field time interval begins with global information that contains parameters that are fixed-length encoded. The coded parameters contained in the global segments are, for example, the scale and leak factors, luminance and chrominance mean values, buffer fullness signal, frame number, and the frame number of the frame following the global segment. The remainder of each field time interval is devoted to high definition frame data which is encoded with a variable-length coding scheme (slice data).

Figure 21:
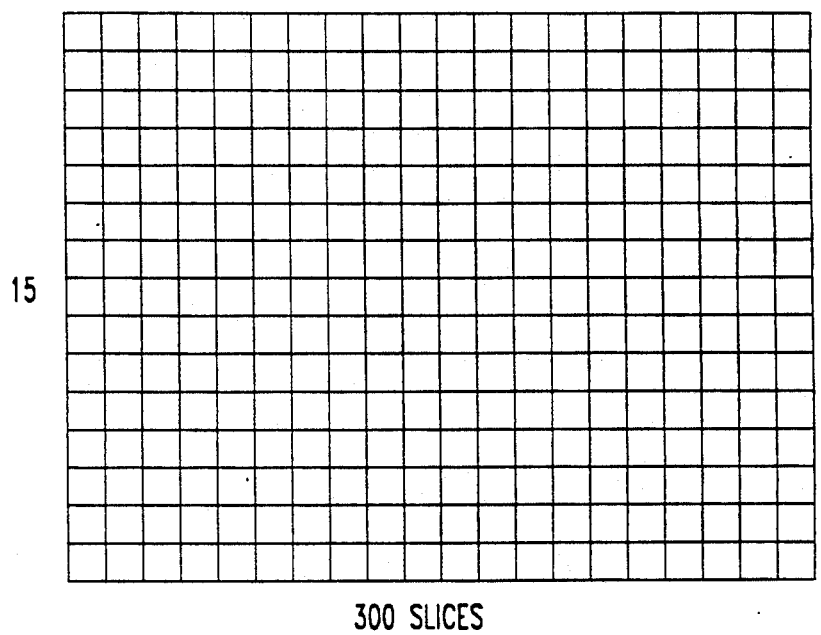
FIG. 21 depicts the image sections represented by the slices.

FIG. 20 shows a field time interval 450 which contains 244 slots and compressed video frames 451 and 452 which contain 300 slices each. The 300 slice array is derived from the image that is divided, as illustrated in FIG. 21, into 20 rows and 15 columns. The amount of data that each slice generates varies in accordance with the image data produced and, thus, compressed video frames 451 and 452 have different lengths.

Obviously, over the long haul, all of the information that is provided by encoder 310 must be delivered out of multiplexer 350, because buffer 320 is finite. As disclosed previously, this result is achieved at least in part by controlling the rate at which data is generated by the video encoder. The other way that this result is achieved is by the encoding process of modulation elements 340 and 345.

In other words, one control is over the rate at which data enters buffer 320, and the other control is over the rate at which data is extracted from butter 320.

In accordance with the disclosures in Faryar et al. in U.S. patent application Ser. No. 07/785,671 filed Oct. 31, 1991, now U.S. Pat. No. 5,243,419, the rate at which data is extracted from buffer 320 is controlled by the apportioning data between the high rate of encoding element 345 and the low rate of encoding element 340. More specifically, element 340 encodes the incoming bits into symbols at the rate of 1-bit per symbol, and element 345 encodes bits into symbols at the rate of 2-bits per symbol. A proper fraction of use of encoders 340 and 345 allows the desired rate (between 1-bit per symbol and 2-bits per symbol) to be achieved. Of course, it is the less important data that is encoded with 2-bits per symbol (e.g., four-level vestigal sideband modulation), while the more important data is encoded at the rate of 1-bit per symbol (e.g., two-level vestigal sideband modulation).

Formatter 330 identifies and selects the more important picture information on a scene-by-scene basis and automatically transmits the corresponding digital data as two-level digital data. The remainder of the picture information is transmitted as four-level digital data.

Improved Leak Treatment

As disclosed earlier, the function of the leak is to include a fraction of the original signal in the displaced frame difference signal so that the predictive coding arrangement described above would be robust. The robustness comes about from the fact that the leak allows a healing of the data in the HDTV receiver, in those instances where a corrupted signal was received and perhaps accepted by the receiver. The same robustness also allows a receiver to initialize itself, which is particularly important when a receiver freshly tunes to a transmitter. The latter robustness is enhanced when the leak is 1 (the leak factor is 0), because this level of leak directs the HDTV receiver (and the decoder section within the transmitter) to ignore the data in the encoder loop buffer (i.e., buffer 42 in FIG. 2 and buffer 206 in FIG. 15). On the other hand, the leak can be 0 sometimes, such as when there is reason to not burden the channel with a fraction of the original signal, and the leak can have any of a number of other values between 0 and 1. How many such "between" values are needed and what those values should be are design choices. For example, in the above disclosure of leak factors, it was suggested that the leak can have the values 1, 15/16 and 1/16 (i.e., leak factors of 0, 1/16 and 15/16). This is a reasonable set of leak values because it allows the receiver to effect such leak with rather simple circuitry. A leak factor of 0 simply disables the signal path from the buffer, a leak factor 1/16 merely shifts the buffer's data by four bits to thus divide each dam word by 16, and a leak factor of 15/16 simply subtracts a shifted data word from itself.

While this set of leak values is quite reasonable, it is also possible that leak values other than multiples of 1/16 may be desirable.

In accordance with this invention, an effective leak value that is other than a multiple of 1/16 is achieved by creating a repeating pattern of leak values that average to the desired leak value. For example, a leak value attained with a repeating pattern of six leak values, where the pattern is: 15/16, 1, 1, 1, 1, 1, results in an average leak value of 0.9896 (compared to 0.9375 for 15/16). The advantage of using a pattern, or a temporal averaging of leak, is that any desired leak value can be achieved without complicating the circuitry in the HDTV receiver.

In accordance with another improved treatment of the leak value, it is recognized that a higher leak value injects a larger portion of the initial signal into the encoder, and that one consequence of a high leak value is that more information must be encoded. By way of example, it is clear that at one extreme, with a leak of 1, the entire picture must be encoded—and that generates a lot of data. At the other extreme, when a still picture is being encoded and the leak is set to 0, then essentially no data needs to be encoded. Connecting this recognition to the buffer fullness that is needed to keep the transmitter's output buffer (element 320 in FIG. 18) and the corresponding receiver's input buffer from overflowing or underflowing, in accordance with this invention, the leak level is controlled by, or responsive to, the buffer fullness. More specifically, when the buffer is fairly full, the leak level is reduced in order to reduce the data that needs to be encoded, and when the buffer is fairly empty, the leak level is increased to permit a larger portion of the original image to be encoded. Of course, a high leak level is the desired state of operation, because the higher leak level makes the system more robust.

The relationship between the leak value and the buffer fullness can be left to the designer. One relationship, for example, may be $$leak = leak_{mid} + k(B_{ref} - B_{curr})$$

where $B_{ref}$ is the desired level of buffer fullness, $B_{curr}$ is the level of buffer fullness at the current frame, $leak_{mid}$ is the leak that should be employed when the buffer is at the desired level of fullness, and k is a selected constant that controls the dynamic range of the variation of the leak value away from $leak_{mid}$ as a function of buffer fullness deviation from $B_{ref}$.

A close correlation to the buffer fullness is the number of symbols that are generated by encoder 345 versus the number of symbols that are generated by encoder 340. This relationship can easily serve as a control for the leak value.

Splicing Video Signals

The previously disclosed designs deal primarily with what happens when video signals are presented for encoding, and with the signal compression that must be realized in order to fit HDTV signals in a limited bandwidth. The question of combining already-encoded signals was not addressed heretofore. Such combining of already-encoded signals, or splicing of compressed signal segments, is clearly needed in many situations, as where a station wishes to inject a local advertisement into a video feed from a remote transmitter.

Splicing cannot be allowed to occur at any point in the signal because, normally, the encoded signal at any point is related to the history of the signal prior to that point. That relationship cannot be disturbed. However, in accordance with our invention, splicing of compressed signal segment is accomplished with impunity by observing the requirement that each compressed segment begin with a leak level of 1. A leak value of close to 1 (e.g. within 25% of 1) will also work, but a leak level of 1 will generally work better.

A leak level of 1, as explained above, is a condition where the data in the receiver's buffer is discarded and the receiver starts to accumulate a signal history anew. At such an instant, an unrelated compressed signal can be spliced in without causing any damage to signals needed in the receiver. A leak level of 1 occurs in the transmitter if the transmitter employs the leak sequence concept disclosed above and the leak sequence includes a leak level of 1. It may be noted in passing that any leak sequence can be made to include a leak level of 1. For example, a desired leak level of ½ can be realized with a sequence such as 0, 1, ½, ½, ½, ½, ½, ½. Of course, a leak level of 1 can also be introduced in the transmitter with each scene change of the video camera (as disclosed earlier), since the image of a new scene is naturally unrelated to the previous scene.

Although the splicing of compressed signal segments can be achieved by simply insuring that each compressed segment begins with a leak level of 1 (leak factor of 0), there is an issue that is associated with a form of buffer fullness, and overall delay of the signal. In particular, it is desirable to have a constant delay between the transmitter and the receiver, and that means that there should be a constant number of frames (compressed) between the transmitter's video camera and the HDTV receiver's display. The only circuit that can affect this delay are the transmitter's output buffer (320) and the receiver's input buffer. Hence, a constant overall delay means that the number of compressed frames in the transmitter's output buffer must equal the total number of frame delays minus the number of compressed frames in the receiver's input buffer.

In the case where a transmitter's signal is spliced out and then spliced back in again (such as with a "commercial interruption"), maintaining the number of frames constant between the transmitter and receiver buffers is important both from the standpoint of insuring that the receiver's buffer does not overflow and from the standpoint of insuring that the number of frames in the two buffers does not change when the transmitter's signal is spliced in again.

One method by which the constant delay can be insured is to insure that the number of compressed frames that are included in the spliced-in (and later spliced-out segment) is exactly equal to the number of compressed frames that were extracted from the receiver's input buffer. Another method for accomplishing this is to insist that a new segment cannot be spliced in except when the transmitted buffer fullness level is within a certain range. To allow for the latter method, the transmitter outputs and transmits the number of compressed frames that are stored in its output buffer, as depicted in FIG. 18 by lead 372 connected to Mux 350.

Figure 22:
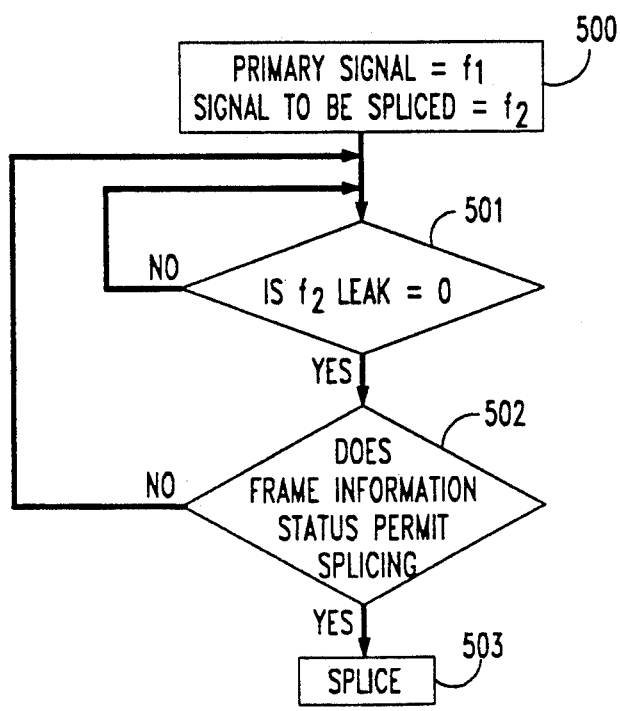
FIG. 22 is a flow chart that illustrates a method for splicing one compressed video signal into another signal.

The methods of splicing described above are depicted in FIG. 22 where block 500 specifies that the primary signal is f1 and the signal to be spliced is f2. Block 501 determines whether the leak condition of f2 permits splicing of f2 into f1; block 502 determines whether the f1 signal's frame information permits splicing; and if the answer is yes in both cases, then block 503 splices f2 into f1. Actually, block 502 is inactive when the segment to be spliced-in is the "commercial". It becomes active when the "commercial" is switched off and the output signal return to the primary signal.

We claim:

1. An encoder including a coder for developing encoder output signals from frame difference signals, prediction means responsive to said encoder output signals for predicting a next frame signals, and means for developing said frame difference signals from a difference between applied next frame signal of an image and output signals of said prediction means multiplied by a leak factor, characterized in that said leak factor is a repeating sequence of constants taken from a set comprising the value 1 and multiples of a negative power of 2.

2. The encoder of claim 1 wherein the set further comprises the value 0.

3. An encoder including
a coder for developing encoder output signals from frame difference signals,
prediction means responsive to said encoder output signals for predicting a next frame signal,
means for developing said frame difference signals from a difference between applied next image frame signal and output signals of said prediction means multiplied by a leak factor, and
means for converting said encoder output signals into symbols by converting a fraction of the encoder output signals in a format that converts groups of encoder output signal bits having a first number of bits, and for further encoding encoder output signals other than said fraction of encoder output signals in a format that converts groups of encoder output signals bits having a second number of bits, characterized in that:
said leak factor is related to said fraction.

4. A method for combining a first encoded video signal and a second encoded video signal, each of which was created by developing a displaced frame difference image signal from a prediction of an applied image signal multiplied by leak factor and from an actual applied image signal, by encoding the displaced frame difference image signal, and by transmitting the encoded signal and the leak factor, comprising the steps of:
forcing each of the encoded video signals to have a preselected leak factor at least some of the time;
splicing-in the second encoded video signal into the first encoded video signal, to thereby replace the first encoded video signal, at a point in the second encoded video signal where the leak factor of the second encoded video signal is at said preselected value.

5. The method of claim 4 wherein the preselected value is 0.

6. The method of claim 4 wherein the preselected value is less than 0.25.

7. The method of claim 4 further comprising a step of splicing-in the first encoded video signal into the second encoded video signal, to thereby re-establish the first encoded video signal, at a point in the first encoded video signal where the leak factor of the first video signal is at said preselected value.

8. The method of claim 7 further comprising a step of outputting a buffer fullness signal associated with the first encoded video signal and characterized in that the step of splicing-in the first encoded video signal into the second encoded video signal, to thereby re-establish the first encoded video signal, occurs at a point in the first encoded video signal where the leak factor of the first video signal is at said preselected value and the buffer fullness signal is within a preselected range.

9. The method of claim 7 characterized in that the step of splicing-in the first encoded video signal into the second encoded video signal, to thereby re-establish the first encoded video signal, occurs at a point in the first encoded video signal where the leak factor of the first encoded video signal is at said preselected value and the number of encoded frames of the second encoded video signal spliced in is within a preselected number of unencoded frames of the second video signal.

* * * * *